E. Y. ROBBINS.
Drying Apparatus.
No. 2,432. Reissued Jan. 1, 1867.
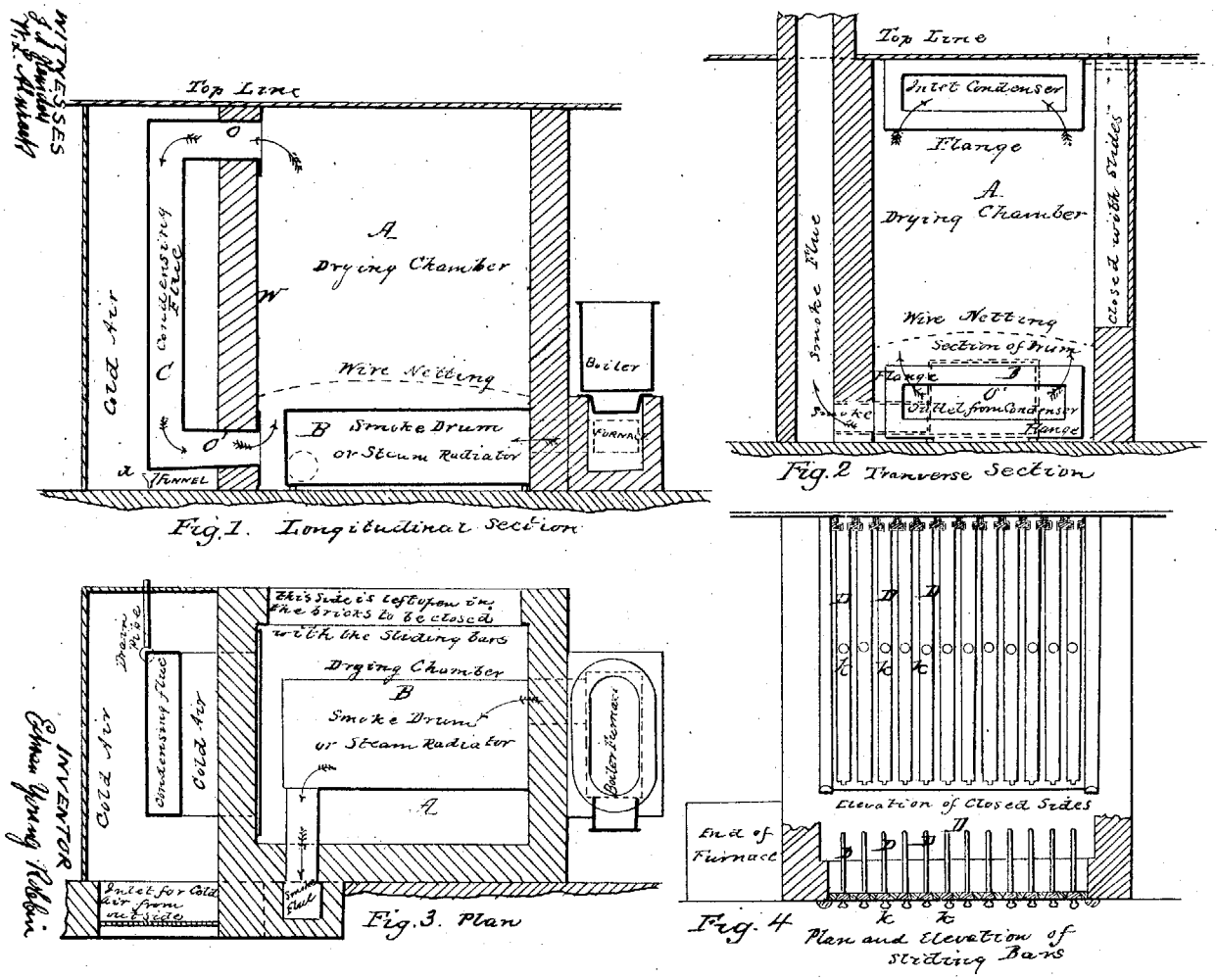
N. PETERS. Photo-Lithographer. Washington, D. C.

United States Patent Office.

EDWARD Y. ROBBINS, OF CINCINNATI, OHIO, ASSIGNEE BY MESNE ASSIGNMENTS OF HIMSELF.

*Letters Patent No.* 43,603, *dated July* 19, 1864; *reissue No.* 2,432, *dated January* 1, 1867.

DRYING APPARATUS.

The Schedule referred to in these Letters Patent and making part of the same.

TO ALL WHOM IT MAY CONCERN:

Be it known that I, EDWARD YOUNG ROBBINS, of the city of Cincinnati, county of Hamilton, and State of Ohio, have invented a new and improved Drying Apparatus; and I do hereby declare that the following is a full and exact description thereof, reference being had to the accompanying drawings, and to the letters of reference marked thereon.

The nature of my invention consists in attaching to a drying-chamber a condenser, made of sheet iron, or other thin material of good conducting qualities, which condenser, being exposed on its exterior surface to the action of the external air, or other cooling agent or agents, condenses the moisture which the warm or heated air carries up from the clothes or other articles to be dried, and allows it to run into a vessel or drain-pipe below, and thus renders the same air capable, when returned to the bottom of the drying-chamber, of taking up another load of moisture, so that the same air may be used over and over again, thus preventing the necessity of admitting within the drying-chamber other air, which is often filled with soot, smoke, or other dirt, which would soil or discolor the clothes or other articles being dried, while the steam from the clothes, &c., being condensed, is carried off in a liquid form, and not permitted to wet the walls and ceiling.

The drying-chamber, A may be constructed of any desired size and shape, with drawers, slides, or other device, D, fig. 4, for sustaining the articles to be dried, and it may be warmed by a flue, or by steam pipes or radiator, B, or by any means most convenient. On one side of the drying-chamber, and opening into it at top and bottom, I place a condenser, C, figs. 1 and 3, made of sheet iron, or other thin material of good conducting qualities, being a pipe or flue, square or round, or of any other desired shape, and of two, three, or four square feet sectional area, or more or less; or, it may consist of several separate pipes or flues of the above construction, enlarging or multiplying the same in proportion to the size of the drying-chamber. This condenser is exposed to the cooling action of the external air by being placed near an open window or between two open windows, or by being placed entirely out of doors, the two openings into the drying-chamber, at top and bottom, O and O′, figs. 1 and 2, being built through the walls of the house, W, fig. 1, the wall of the drying-chamber being in this case also the wall of the house. The area of these openings or spaces of communication between the drying-chamber and the condenser, O and O′, figs. 1 and 2, may be enlarged or reduced, as may be found most convenient. The air in the lower part of the drying-chamber, becoming heated or warmed, rises up among the clothes, (or whatever may be in process of drying,) carrying up the moisture from them, passes over into the condenser at the upper opening, O, figs. 1 and 2, and the moisture is condensed and runs out through an orifice at *d*, fig. 1, while the air itself, being thus relieved of its superabundant moisture, flows again into the drying-chamber through the lower opening, O′, figs. 1 and 2, and is again heated and ascends to carry up other loads of moisture; and thus it continues to circulate round and round. In case of warming the drying-chamber with a flue or drum, I pass the smoke and gases of combustion from the furnace or stove where the wash water is heated into a sheet-iron or other suitable drum or flue, B, figs. 1, 2, and 3, in the lower part of drying-chamber, from which they are discharged into the chimney. A few inches above this drum or flue, I stretch a netting of wire, or other suitable material, to prevent the clothes, in case of falling, from being burned or injured upon the hot drum below.

What I claim as my invention, and desire to secure by Letters Patent, is—

1. So arranging the drying-chamber and drum or flue B, and the furnace or stove for heating the wash water, that the drying-chamber shall be heated by the surplus heat passing from the furnace or stove through a drum or flue, B, placed in the drying-chamber, substantially as set forth.

2. The application of a condenser to a drying-chamber, as above described, or any equivalent arrangement for producing the same effect, substantially in the same manner.

3. I claim the netting, when placed over the drum or flue to catch the clothes in case of falling, and thus prevent their being burned, the same being arranged substantially as set forth.

In testimony whereof I have signed my name to this specification before two subscribing witnesses.

EDWARD Y. ROBBINS.

Witnesses:

W. L. ALDRICH,

J. H. MARTIN.